United States Patent
Kay et al.

(10) Patent No.: US 10,230,848 B2
(45) Date of Patent: Mar. 12, 2019

(54) METHOD AND SYSTEM FOR CONTROLLING COMMUNICATIONS FOR VIDEO/AUDIO-CONFERENCING

(71) Applicant: NOWHERE DIGITAL LIMITED, Surrey (GB)

(72) Inventors: Bozwell Kay, Lustleigh (GB); Marc Cornwell, Gloucestershire (GB); Nicholas Udall, Surrey (GB)

(73) Assignee: NOWHERE DIGITAL LIMITED, Surrey (GB)

( * ) Notice: Subject to any disclaimer, the term of this patent is extended or adjusted under 35 U.S.C. 154(b) by 0 days.

(21) Appl. No.: 15/156,419

(22) Filed: May 17, 2016

(65) Prior Publication Data

US 2016/0344780 A1 Nov. 24, 2016

(30) Foreign Application Priority Data

May 18, 2015 (GB) .................................... 1508521

(51) Int. Cl.
*H04M 3/56* (2006.01)
*H04L 29/06* (2006.01)

(52) U.S. Cl.
CPC ........ *H04M 3/563* (2013.01); *H04L 65/4038* (2013.01); *H04M 3/568* (2013.01); *H04M 3/569* (2013.01); *H04M 2203/5072* (2013.01)

(58) Field of Classification Search
CPC ................. H04M 3/563; H04M 3/568; H04M 2203/5072; H04L 65/4038
See application file for complete search history.

(56) References Cited

U.S. PATENT DOCUMENTS

| 5,440,624 | A | 8/1995 | Schoof, II |
| 8,681,203 | B1 | 3/2014 | Yin et al. |
| 2008/0010347 | A1* | 1/2008 | Houghton ......... H04L 29/06027 709/205 |
| 2009/0296909 | A1 | 12/2009 | Anglin et al. |

(Continued)

FOREIGN PATENT DOCUMENTS

GB 2506102 A 3/2014

OTHER PUBLICATIONS

GB Search Report dated Jan. 16, 2017 in GB Application No. 1508521.0 (2 pages).

*Primary Examiner* — Afshawn M Towfighi
(74) *Attorney, Agent, or Firm* — Nixon & Vanderhye P.C.

(57) ABSTRACT

The present invention relates to a method for controlling communications for an online meeting. The method includes, at each of a plurality of user devices, receiving audio from one of a plurality of participants via a microphone, at least one processor coordinating transmission of the audio from each of the plurality of user devices to the other user devices via a communications system, the processors progressing through multiple stages for the online meeting where each stage is associated with audio configuration data, and at each stage, the at least one processor automatically muting audio received from one or more of the plurality of user devices in accordance with the audio configuration data associated with that stage such that the muted audio is not generated at the other user devices. Other systems and methods for controlling communications and managing online meetings are disclosed.

16 Claims, 18 Drawing Sheets

(56) References Cited

U.S. PATENT DOCUMENTS

| | | | |
|---|---|---|---|
| 2010/0080374 A1* | 4/2010 | Hepworth | H04M 3/42365 379/202.01 |
| 2011/0187814 A1 | 8/2011 | Nimri et al. | |
| 2015/0117626 A1* | 4/2015 | Nord | H04M 3/568 379/202.01 |
| 2016/0027134 A1* | 1/2016 | Alvarado | G06Q 50/18 705/311 |

* cited by examiner

METHOD AND SYSTEM FOR CONTROLLING COMMUNICATIONS FOR VIDEO/AUDIO-CONFERENCING

This application claims priority to GB Patent Application No. 1508521.0 filed 18 May 2015, the entire content of which is hereby incorporated by reference.

FIELD OF INVENTION

The present invention is in the field of online conferencing solutions. More particularly, but not exclusively, the present invention relates to control and management of communications for video/audio-conferencing.

BACKGROUND

Video conferencing enables individuals to speak with one another remotely. Some video conferencing systems also facilitate the sharing of data such as documents or images.

One example of a video conferencing system is Skype™. Skype™ permits users to add contacts and manage contacts in an address book. Skype™ enables users to initiate a text chat, voice or video conference with one or more of their contacts by clicking on a set of simple buttons. While in a video conference, users' screens can be shared with one another.

Video conferencing systems are sometimes used as a replacement for meetings when it is inconvenient to arrange a place and time where all participants for a meeting can meet.

However, meetings held using a video conferencing system lose the behavioural cues of physical meetings and consequently meetings held using video conferencing systems can be less efficient and less effective than face-to-face meetings.

There is a desire for an improved system for video/audio conferencing which is capable of facilitating more efficient and more effective meetings.

Furthermore, it would also be useful if video/audio conferencing systems could be improved to provide advantages above and beyond traditional physical meetings.

There exist some systems which attempt to address, at least in part, this desire. One of these is GoToMeeting™. This system enables users to start an online meeting space and invite participants. It provides the ability to schedule meetings beforehand, which conventional video conferencing systems, such as Skype™ do not. It also enables users to grant keyboard and mouse functionality over their computer system to others in the conference.

Another such system is WebEx™ by Cisco™. WebEx™ provides a mechanism to enable users to construct a webinar. A webinar is an online space where a participant (the "presenter") can speak and many participants can observe. Once a user is signed up, webinars can be scheduled much as meetings are in GoToMeeting™. Text, audio and video conferencing is provided within WebEx™. Some users repurpose WebEx™ to conduct meetings.

Some prior art conferencing systems provide audio suppression when a user is not overtly speaking to prevent background noise from interfering with the conference call/online meeting. However, a difficulty with existing conferencing systems is that none provide sufficient structured control over communications between participants within a video conference. Accordingly, video conferencing technologies lead to a cacophony of audio to and from participants that can preclude utilising standard video conferencing technology to run, for example, online meetings where multiple participants provide audio contributions in a structured format.

It is an object of the present invention to provide a method and system for controlling communications for video/audio conferencing which overcomes the disadvantages of the prior art, or at least provides a useful alternative.

SUMMARY OF INVENTION

According to a first aspect of the invention there is provided a method of controlling communications for an online meeting, including:

a. at least one processor coordinating transmission of audio from each of the plurality of user devices to the other user devices via a communications system;
b. the at least one processor progressing through multiple stages for the online meeting; wherein each stage is associated with audio configuration data; and
c. at each stage, the at least one processor automatically muting audio received from one or more of the plurality of user devices in accordance with the audio configuration data associated with that stage such that the muted audio is not generated at the other user devices;
wherein the audio is received at each of the plurality of user devices from one of a plurality of participants via a microphone.

According to a further aspect of the invention there is provided a method of controlling communications for an online meeting, including:

a. at least one processor coordinating transmission of communications from a plurality of participants to other participants via a communications system;
b. the at least one processor creating a plurality of groups within the plurality of participants; and
c. the at least one processor coordinating transmission of communications between the participants of each group via the communications system such that communications are not transmitted between the groups;
wherein the communications are received at each of a plurality of user devices from a plurality of participants.

According to a further aspect of the invention there is provided a method of managing an online meeting, including:

a. at least one processor receiving a definition for a plurality of stages for an online meeting from one of a plurality of meeting participants;
b. the at least one processor controlling progress of the online meeting in accordance with the defined stages; and
c. the at least one processor receiving modification to the definition of the plurality of stages from the meeting participant during progress of the online meeting, such that stages are added, removed and/or re-arranged within the definition.

According to a further aspect of the invention there is provided a communications controller comprising at least one processor configured to perform the method of any of the above aspects.

According to a further aspect of the invention there is provided a system for controlling communications, including:

A communications controller as specified in the above aspect;
A communications system; and
A plurality of user devices.

Other aspects of the invention are described within the claims.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

The present invention provides an improved communications control method and system for video/audio conferencing.

The inventor has discovered that existing video/audio conferencing technologies are less effective for collaborations, such as online meetings, where multiple participants contribute. To improve upon existing video/audio conferencing technologies the inventor has devised a communication controller which uses audio configuration data to control the transmission of audio between the devices of multiple participants in a video/audio conference. Progressive stages within an online conference/meeting can be associated with different audio configuration data to control, for example, blocking/muting of different users' video/audio.

Such a system may even provide advantages beyond physical meetings which rely only on behavioural clues, because the system may guide a meeting using the system via audio controlled stages that individuals could not enforce in a normal face to face meeting. Such a meeting could, therefore, be more effective than a face to face meeting.

Figure 1:
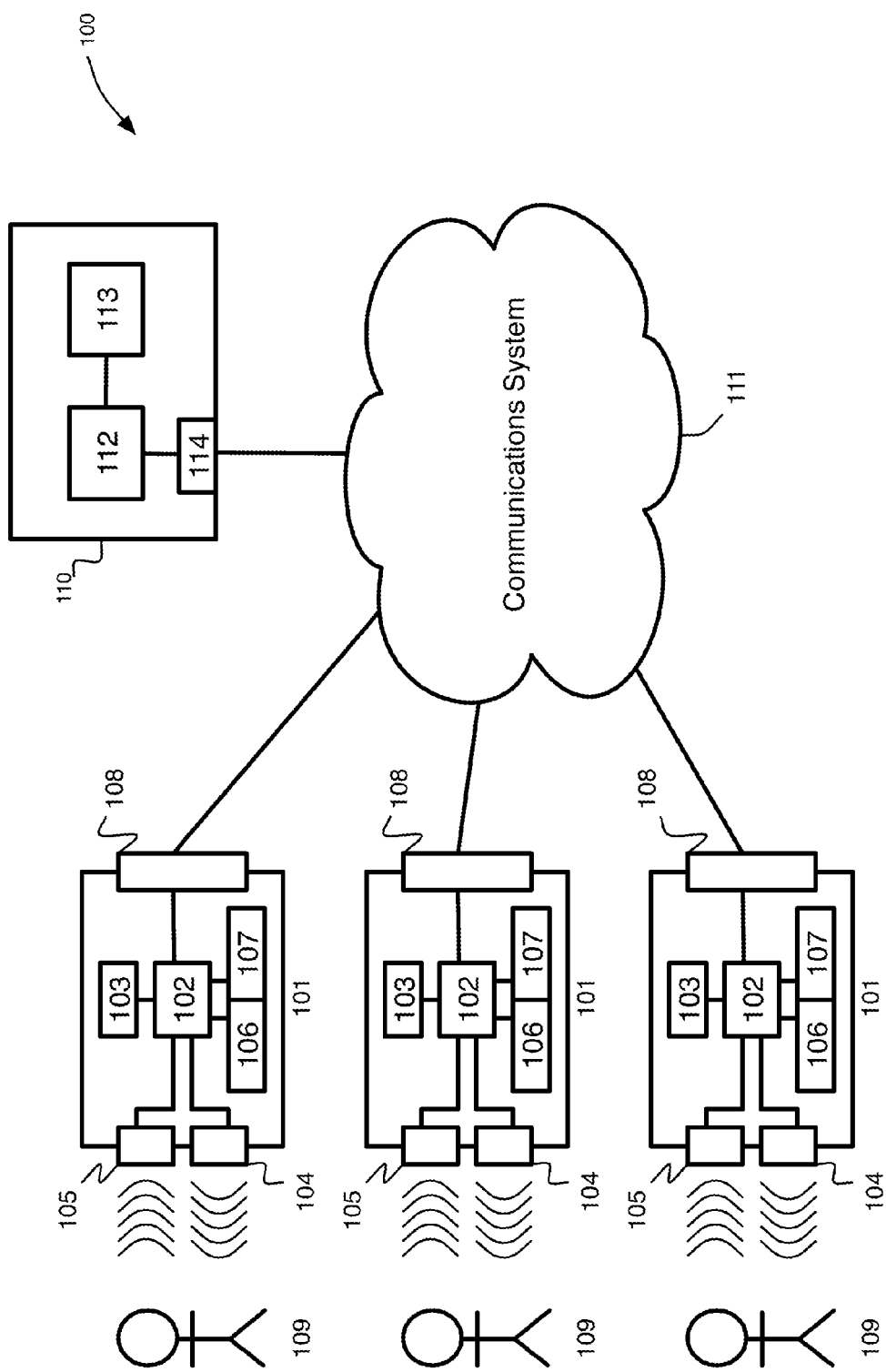
FIG. 1: shows a block diagram illustrating a system in accordance with an embodiment of the invention.

In FIG. 1, a communications control system 100 in accordance with an embodiment of the invention is shown.

A plurality of user devices 101 are shown. The user devices 101 may be general computing devices such as personal computers, laptops, tablets, or smart-phones; interactive multiple-purpose devices such as Internet televisions; or single purpose video conference devices. Each user device 101 may include a processor 102, a memory 103, an audio output 104 such as a speaker, an audio input 105 such as a microphone, a display 106, an input 107, such as a mouse, keyboard, and/or touch/near-touch-input, and a communications module 108.

Each user device 101 may be configured for receiving audio from a user 109 via the audio input and transmit an audio stream for receipt by the other user devices 101. The audio stream may be transmitted via a communications controller 110, or alternatively the audio stream may be under the control of the communication controller 110 but may be transmitted between the user devices via a peer-to-peer communications protocol.

A communication system 111 is shown. The communications system 111 may be a local area network, a wide-area network, a wireless network, the Internet, a cellular network, or a combination of any of the preceding networks.

The communication system 111 is configured to facilitate communications between the user devices 101 and the communications controller 110, and may be configured to facilitate communications between the user devices 101.

The communication controller 110 is also shown. The communications controller 110 may include one or more processors 112, a memory 113, and a communications module 114.

The communications controller 110 may be configured to coordinate transmission of audio streams between the user devices 101 via the communication system 111. The communications controller 110 may coordinate transmission using audio configuration data stored within the memory 113.

The user devices 101 may be further configured for displaying a user interface to the user 109 via the display 106 and for receiving input from the user 109 via input 107. The user interface may be delivered by or under the control of the communications controller 110.

Embodiments of the invention will now be described in application to an online meeting, but it will be appreciated that embodiments of the invention may be used for other structured collaborative applications using video/audio conferencing systems.

A plurality of participants may join and contribute to an online meeting via their user device 101. The online meeting may be structured into a series of stages. The meeting may be structured by one of the participants (such as the meeting organiser), an administrator, or by a group of the participants. The meeting may be structured into the stages in advance of the meeting beginning, dynamically during the meeting or a combination of the two. Each stage may be associated with audio configuration data. Selection of the stages may be user-defined, and each stage type may be associated with default audio configuration data. The communications controller 110 may be configured for controlling progress through the stages of the online meeting.

Figure 2:
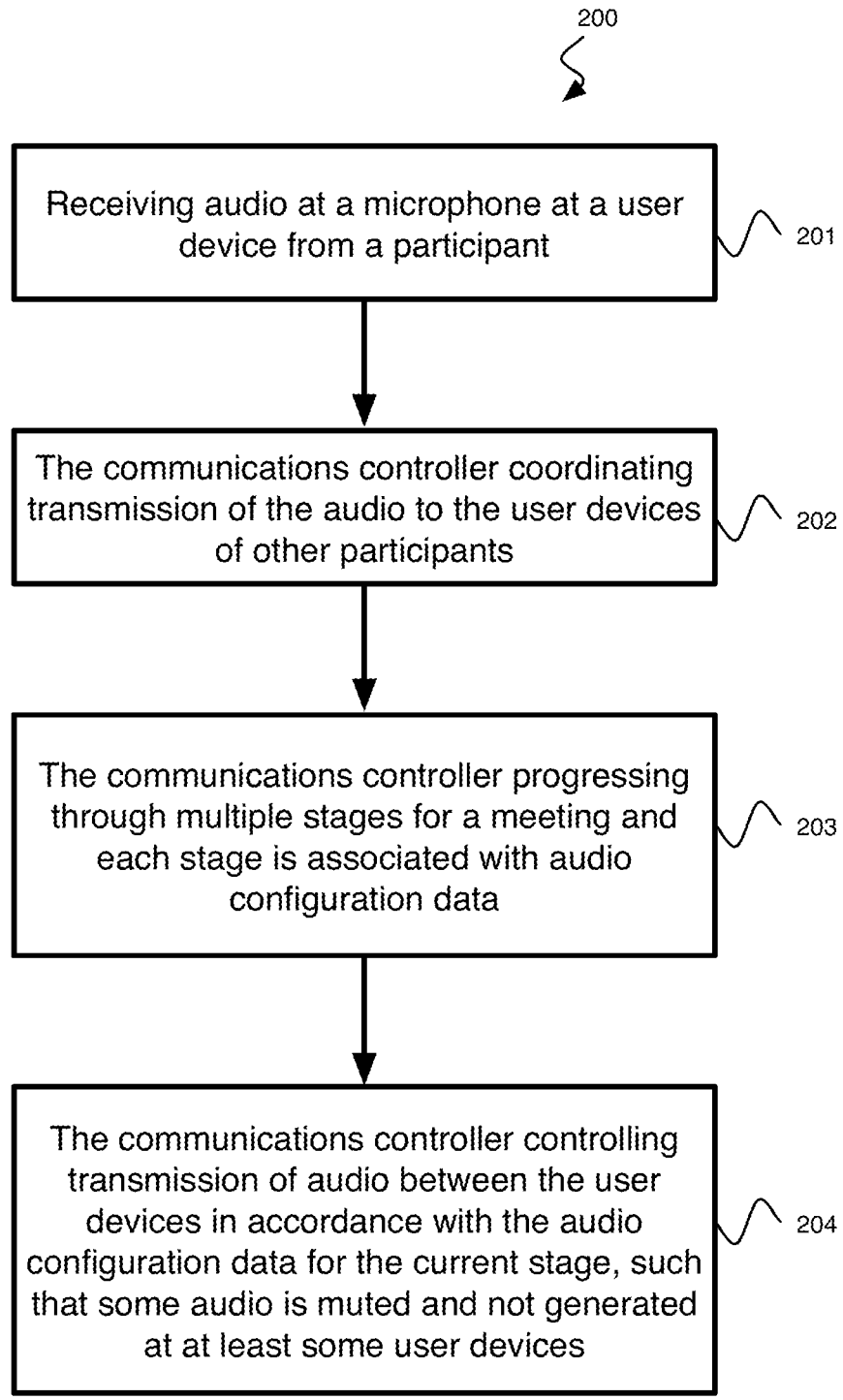
FIG. 2: shows a flow diagram illustrating a method for controlling communications in accordance with an embodiment of the invention.

Referring to FIG. 2, a communications control method 200 for an online meeting in accordance with an embodiment of the invention will be described.

In step 201, at a microphone 105 at each of a plurality of user devices 101, audio is received from a user 109 of the device 101. The users 109 may be participants in an online meeting. A user interface may be displayed on each user device 101. The user interface may display indicators to the participant 109 when others are speaking, when others' audio is muted, and when their audio is muted.

In step 202, at least one processor 112 of a communications controller 110 coordinates transmission of the audio received at the user devices 101 to the other user devices via a communication system 111. In one embodiment, the audio is first transmitted from each user device 101 to the communications controller 110 which can then control retransmission of the audio to the other user devices. In an alternative embodiment, the user devices 101 transmit the audio to the other user devices via another transmission system or directly via a peer-to-peer system across the communications system 111; and the communication controller 110 instructs either the user devices 101 or the transmission system to control transmission of the audio.

In step 203, the processor(s) 112 at the communications controller 110 progress through the multiple stages for the online meeting. Each stage is associated with audio configuration data. The audio configuration data may define when and how the audio for one or more of the plurality of participants 109 (e.g. a sub-group of the participants) is to be muted.

In step 204, the processor(s) 112 at the communications controller 110 control transmission of the audio between the user devices 101 in accordance with the audio configuration data. Where the audio configuration data defines that audio for one or more participants is to be muted, the audio from muted participants is controlled to prevent generation of that audio at the other user devices. In one embodiment, the communications controller 110 halts transmission of the audio from the user devices of the muted participants to the other participants. In an alternative embodiment, the communications controller 110 instructs the user devices not to generate the audio received from the user devices of muted participants. In yet a further embodiment, the communications controller 110 instructs the muted user devices to mute their microphone.

In one embodiment, one or more participants may be permitted to override the audio configuration data defining muting of audio. The one or more participants may be permitted to override only their own muted audio or others' muted audio. In one embodiment, only the meeting organiser may be able to override the audio configuration data.

Figure 3:
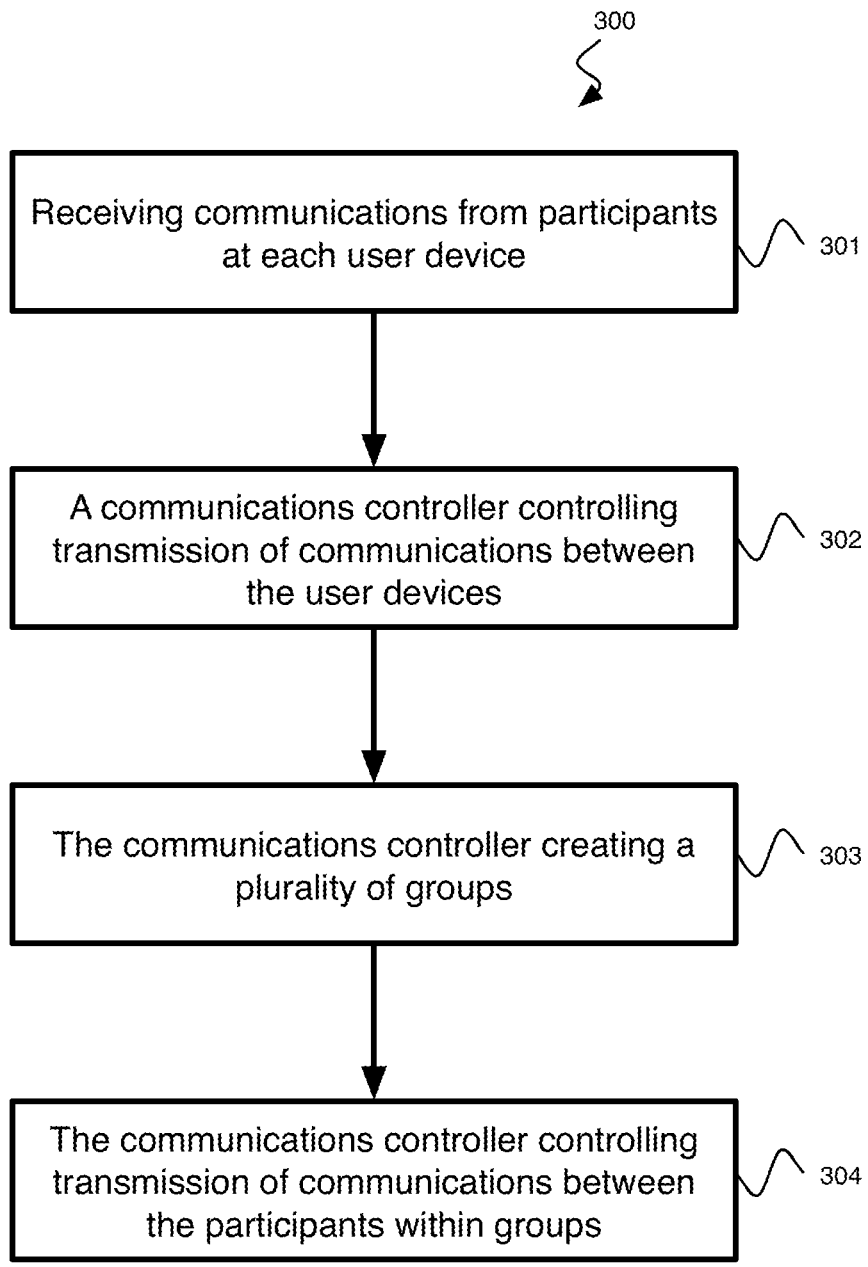
FIG. 3: shows a flow diagram illustrating another method for controlling communications in accordance with an embodiment of the invention.

Referring to FIG. 3, another communications control method 300 for an online meeting in accordance with an embodiment of the invention will be described.

In step 301, communications from participants 109 are received at each user device 101. The communications may include audio and/or video of the participant 109 captured via microphone 104 and camera at the user device 101 respectively. A user interface may be displayed at each user device 101 for displaying and/or generating the communications received from the other participants.

In step 302, the processor(s) 112 of the communications controller 110 control or coordinate transmission of the communications to the other user devices.

In step 303, the processor(s) 112 of the communications controller 110 create a plurality of groups of participants 109. The participants 109 for each group may be defined by the communications controller 110 based upon random allocation, definitions provided for a stage of the online meeting, and/or on the basis of information provided by one or more of the participants 109 (for example, the participant that is the meeting organiser). In one embodiment, the majority of the groups comprise only two participants. A user interface at each participant's user device 101 may indicate to the participant 109 the other members of their group. In one embodiment, the user interface displays avatars (i.e. representations) of the participants 109 of their group.

In step 304, the processor(s) 112 of the communications controller 110 control or coordinate transmission of the communications between the participants 109 of each group such that communications are not transmitted between the groups.

In one embodiment, where the online meeting is comprised of a plurality of stages, one stage may define for communications for all participants 109 to be transmitted to every other participant 109 and another stage may define for communications for all participants 109 to be transmitted to only those participants 109 in their group. The communications controller 110 may coordinate appropriate transmission of the communications on the basis of the definitions for the current stage of the online meeting.

Figure 4:
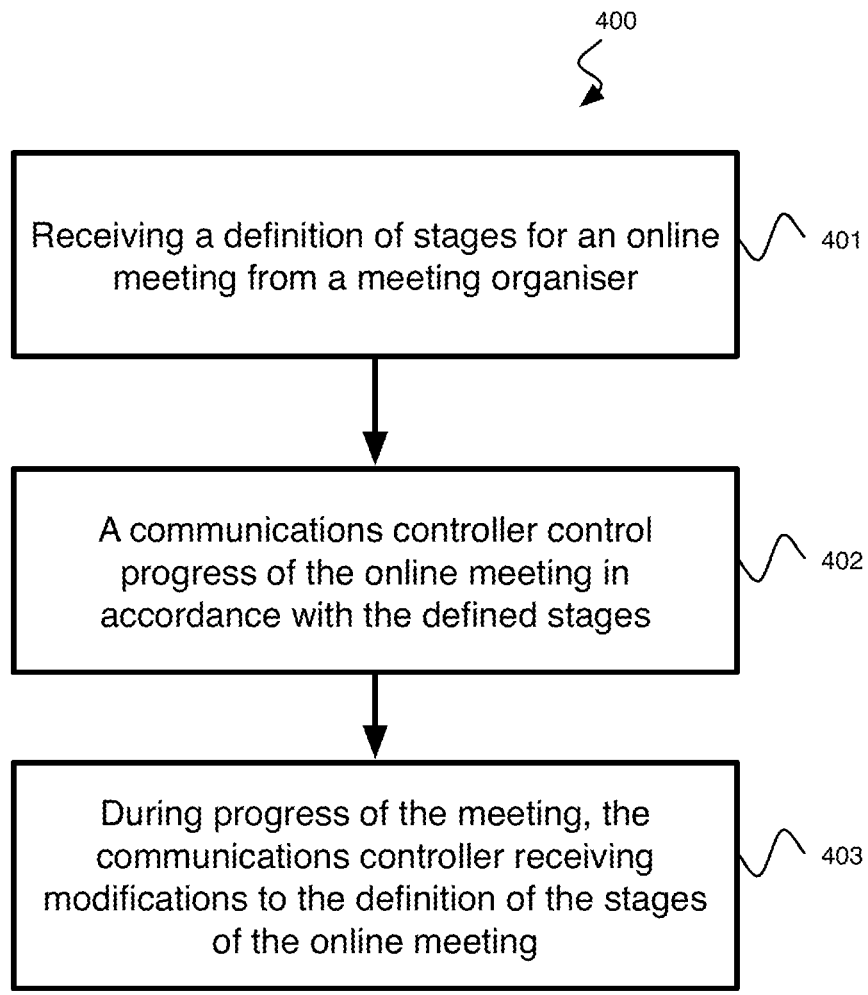
FIG. 4: shows a flow diagram illustrating a method for managing an online meeting in accordance with an embodiment of the invention.

Referring to FIG. 4, a method of managing an online meeting 400 in accordance with an embodiment of the invention will be described.

In step 401, the communication controller 110 may receive a definition of a plurality of stages for the online meeting from one of the meeting participants. The participant may be the meeting organiser.

In step 402, the communications controller 110 may control progress of the online meeting in accordance with the defined stages.

In step 403, the communications controller 110 may receive modification to the definition of stages from the meeting participant (e.g. the meeting organiser) during progress of the online meeting to add, remove or re-arrange the stages within the definition.

The stages may define how the communications controller 110 controls or coordinates transmission of communications between the participants 109.

The stages may be selected from several stage types. Each stage type is associated with data which instruct the communications controller 110 on the control/coordination of transmission.

The stage types will now be described in reference to online meeting terminology. However, it will be appreciated that what is novel is the functionality of the stage and the labelling given to the stage is not intended to be limiting to its application.

The stage types may include:

i) A waiting stage which is associated with data which instructs the communications controller 110 to control/coordinate transmission of the audio from each participant 109 who has joined the online meeting to every other joined participant. During the waiting stage, new participants may join the online meeting, and the communications controller 110 will route audio to/from those new participants.

ii) A check-in stage which is associated with data which instructs the communications controller 110 to control/coordinate transmission of audio from a selected participant to every other participant, and to mute the audio of every other participant. During the check-in stage, each of the participants can elect to be selected in turn. For example, the user speaks, then clicks to finish, and the next user clockwise is able to speak automatically, then clicks to finish and so on.

iii) A presentation stage which is associated with data which instructs the communications controller 110 to control/coordinate transmission of audio from a specified participant to every other participant, and to mute the audio of every other participant. During the presentation stage, one of the participants is specified during definition of the stage, and that participant can actuate display of a visual presentation within the user interfaces of other participants. The visual presentation may be the screen of the user device of specified participant, video from the camera of the specified participant, and/or display of slides or other document. In one embodiment, within the user interfaces of the other participants, a participant can indicate that they have a question. The specified participant may select that participant. Accordingly, the communication controller 110 will control/coordinate transmission of both the specified and selected participant to every participant, while muting the audio of the remaining participants.

iv) A decision stage which is associated with data which instructs the communications controller 110 to control/coordinate transmission of audio from each participant to every other participant. During the decision stage, participants may be presented with a decision on their user interface and input to define a vote for one of a plurality of options for the decision may be received from the participant via the user interface.

v) A dialogue stage which is associated with data which instructs the communications controller 110 to control/coordinate transmission of audio from each participant to every other participant. During the dialogue stage, participants may be presented with a file to discuss on their user interface and input may be received from the participant via the user interface to define to what extent the participant might agree with a current speaking participant. In an alternative embodiment, all users are muted, but can click a button to speak. When a user is speaking and a second user clicks the button to speak, the second user is placed in a queue. Only when the speaking user clicks a button to finish speaking, can the next person in the queue speak. This may, for example, facilitate a linear dialogue between the users. In a yet further embodiment, when a user is speaking, nobody is permit to click to speak. Other users must wait for the speaker to finish. Once the speaker finished the speak button becomes active and the next user to click on it can speak (i.e. a race to the speak button).

vi) A question and answer stage which is associated with data which instructs the communications controller 110 to control/coordinate transmission of audio from a first participant to every other participant, and mute the audio of every other participant unless that participant is selected during the stage. During the question and answer stage, a first participant is defined from the plurality of participants to answer questions. Within the user interfaces of the remaining participants, a participant can indicate that they have a question. The first participant (this is the answerer, a single user defined before the phase starts) may select that participant. Accordingly, the communication controller 110 will control/coordinate transmission of both the first and selected participant to every participant, while muting the audio of the remaining participants.

vii) A reflection or break stage which is associated with data which instructs the communications controller 110 to mute the audio of every participant.

viii) A groups or pairs stage which is associated with data which instructs the communications controller 110 to control/coordinate transmission of audio between participants within their groups only. During this stage, the participants are sorted into a plurality of groups or pairs. The sorting may occur with the assistance of the participant who is the meeting organiser.

The one or more user interfaces as described above may be provided to the participants at their user devices 101 based upon the current stage for the online meeting.

The user interfaces may be transmitted directly from the communications controller 110 to the user device 101 via the communications system 111, or the user interfaces may be triggered at the user device 101 by the communication controller 110.

These interfaces will now be described with reference to FIGS. 5 to 14b.

Figure 5:
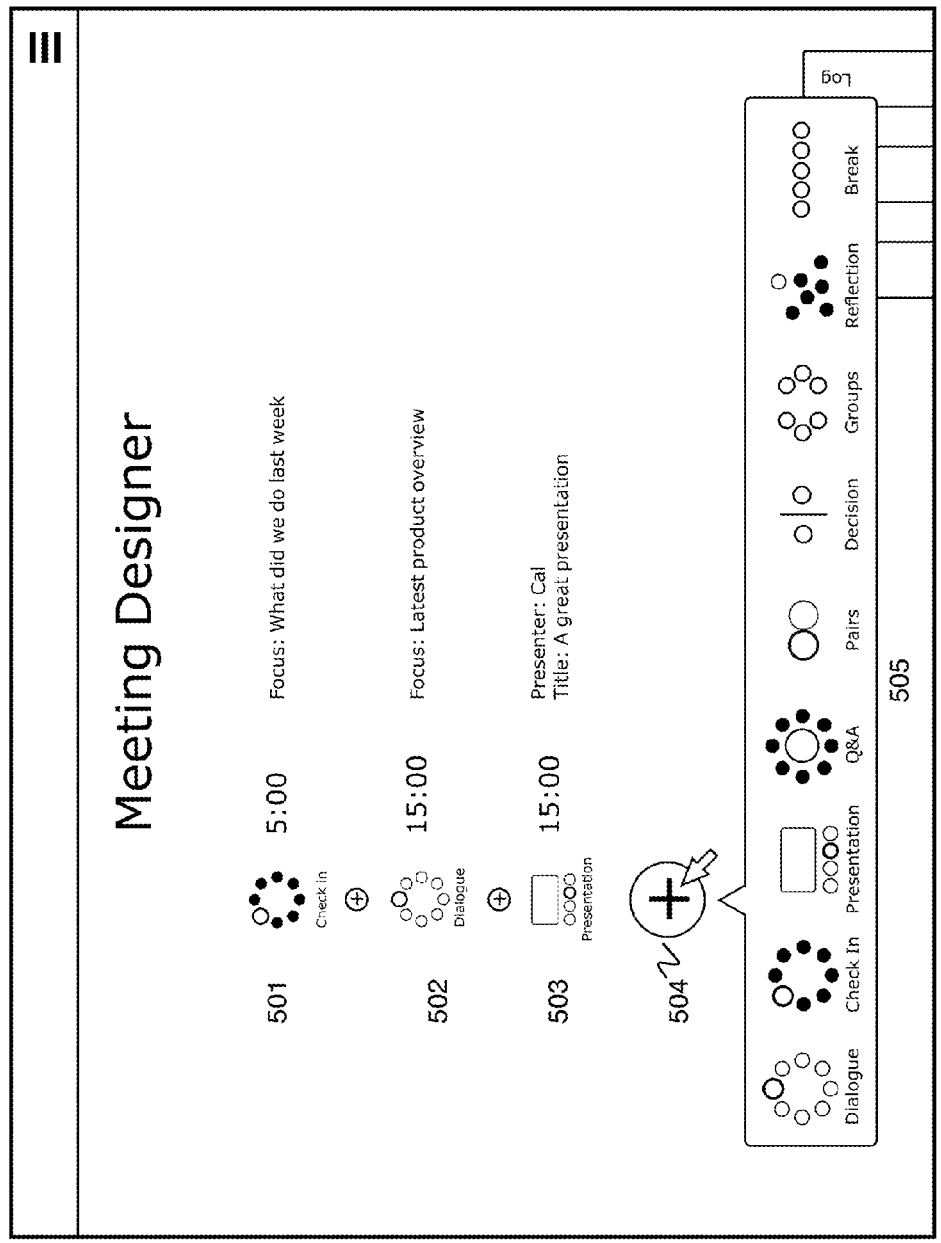
FIG. 5: shows a screenshot illustrating an exemplary user interface displayed on the user device of a meeting organiser for constructing the stages of the meeting in accordance with an embodiment of the invention.

FIG. 5 shows an exemplary user interface presented on the user device 101 of a participant 109 who is designated as the meeting organiser.

This user interface is displayed to a meeting organiser on their user device 101 prior to commencement of the online meeting. The user interface shows the definition of several successive stages 501, 502, and 503 for a meeting. In this example, the stages check-in 501, dialogue 502, and presentation 503 are shown.

The meeting organiser can add further stages by clicking on the plus button 504 and selecting one of the icons 505 displayed designating the different possible stage types.

Figure 6:
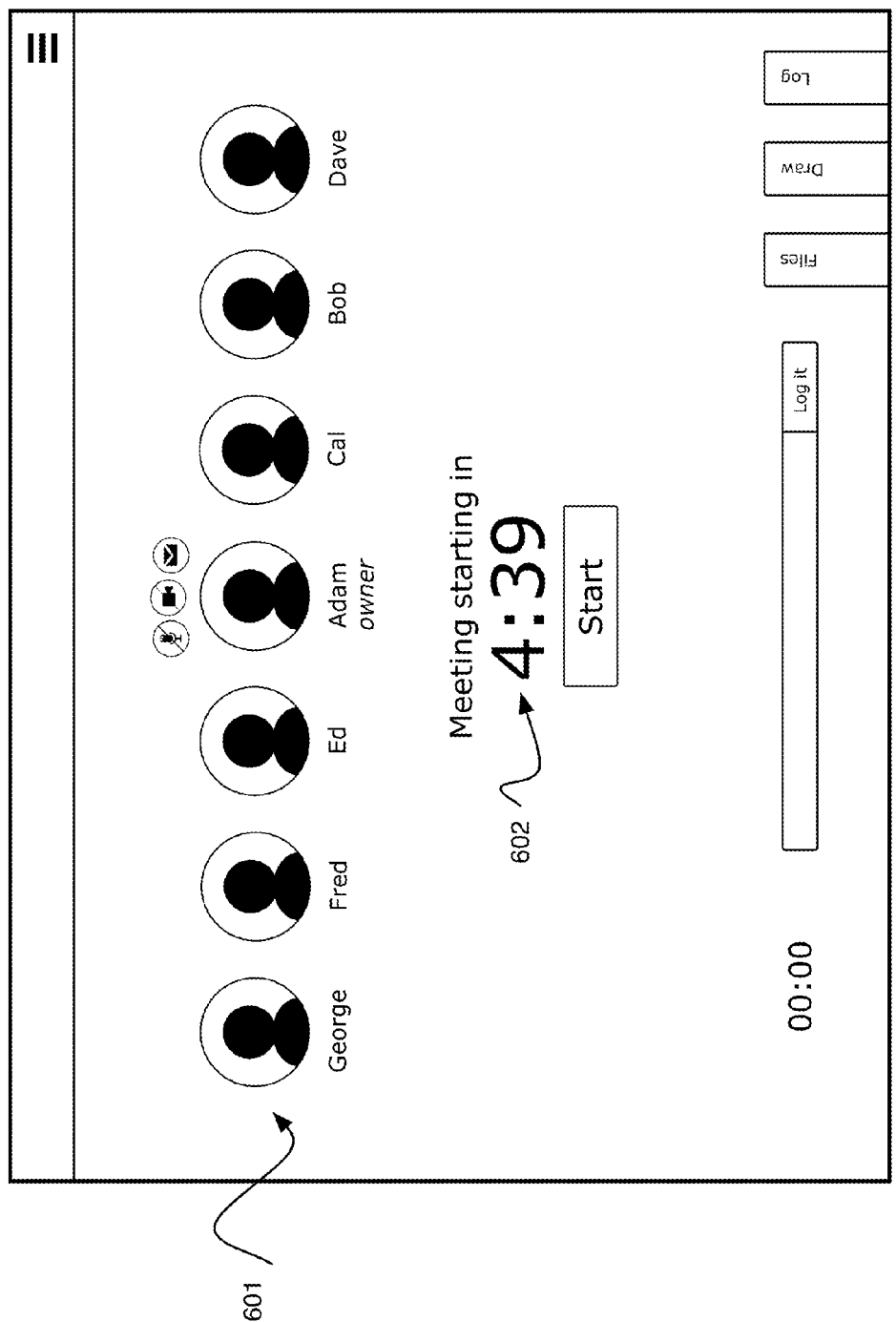
FIG. 6: shows a screenshot illustrating an exemplary user interface displayed on the user device of a participant during a waiting stage in the meeting in accordance with an embodiment of the invention.

FIG. 6 shows an exemplary user interface presented on the user device 101 of a participant 109 when the current stage is waiting.

During this stage, all the participants are shown on the user interface represented by avatars 601 and/or their names. An indicator 602 may be displayed showing how long in minutes and seconds until the online meeting will begin.

Figure 7:
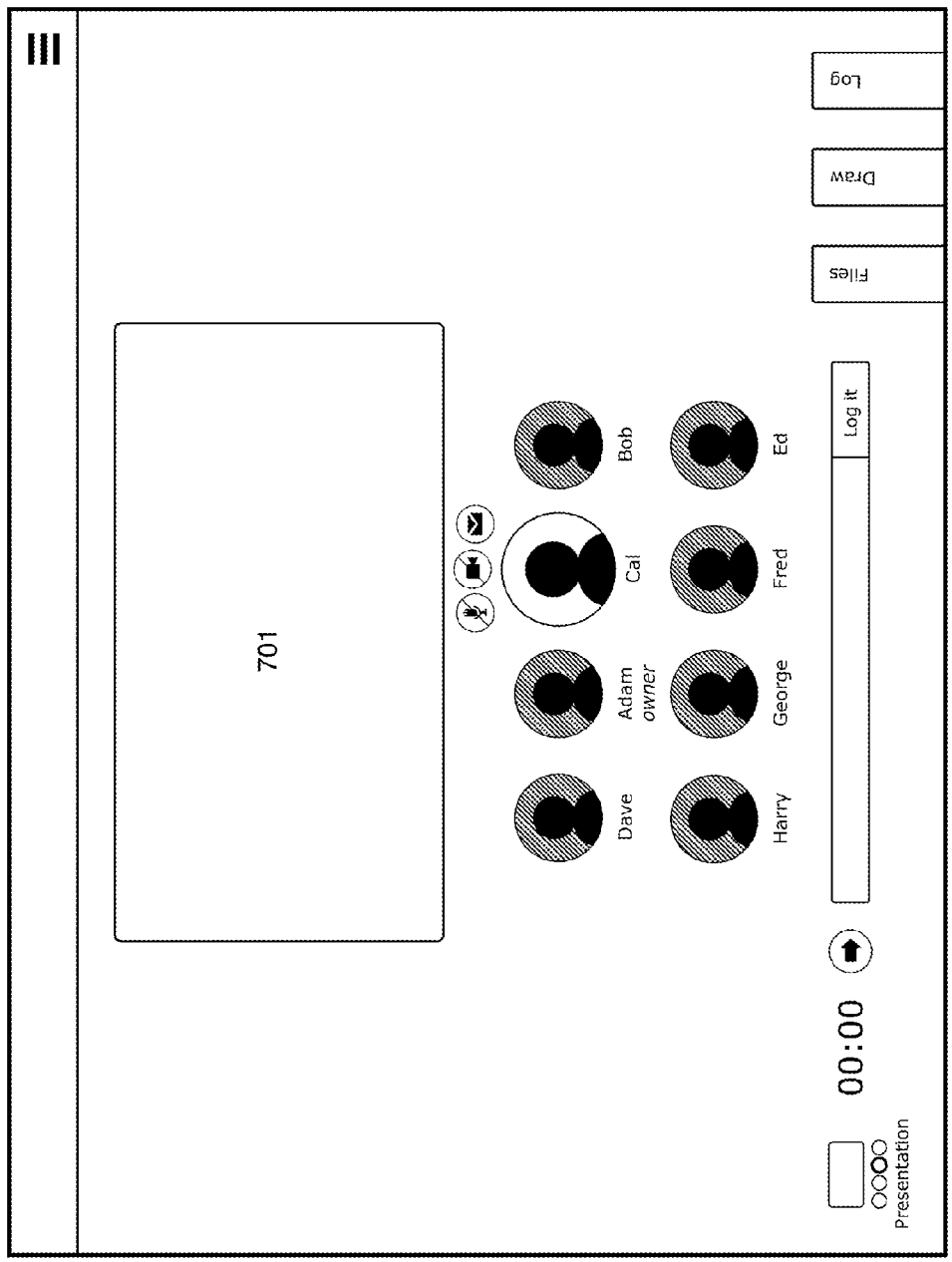
FIG. 7: shows a screenshot illustrating an exemplary user interface displayed on the user device of a participant during a presentation stage in accordance with an embodiment of the invention.

FIG. 7 shows an exemplary user interface presented on the user device 101 of a participant 109 when the current stage is presentation.

A visual presentation 701 is displayed within the user interface. The visual presentation 701 may be video from the camera of the presenting participant, the screen of the presenting participant's user device, and/or slides or another document.

Figure 8:
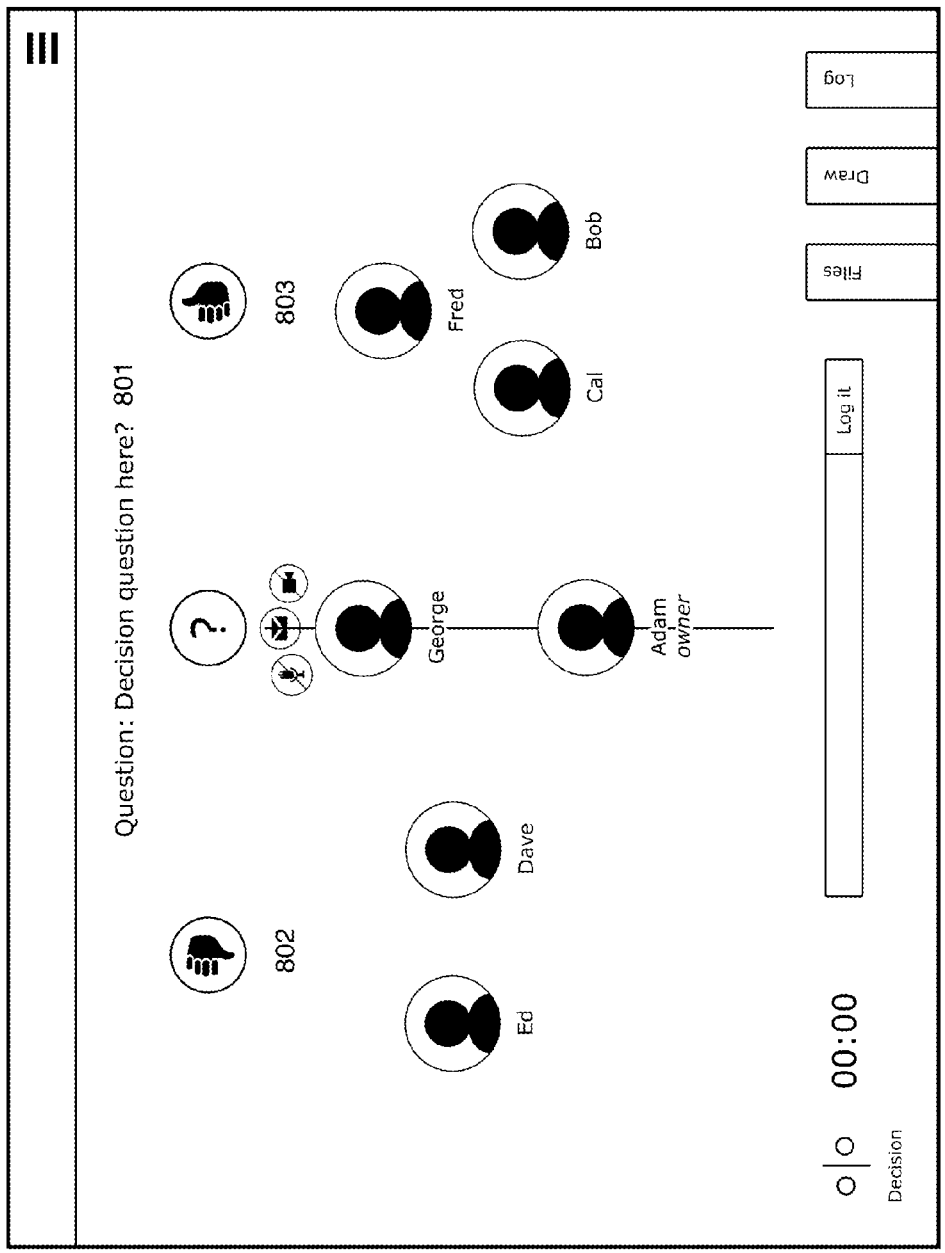
FIG. 8: shows a screenshot illustrating an exemplary user interface displayed on the user device of a participant during a decision stage in accordance with an embodiment of the invention.

FIG. 8 shows an exemplary user interface presented on the user device 101 of a participant 109 when the current stage is decision.

In this embodiment, a scenario 801 is displayed to the participant 109 within the user interface on their user device 101 and two options 802 and 803 are displayed to the participant 109. The first option 802 indicates a yes or approval to the scenario and the second option 803 indicates a no or disapproval to the scenario.

Figure 9:
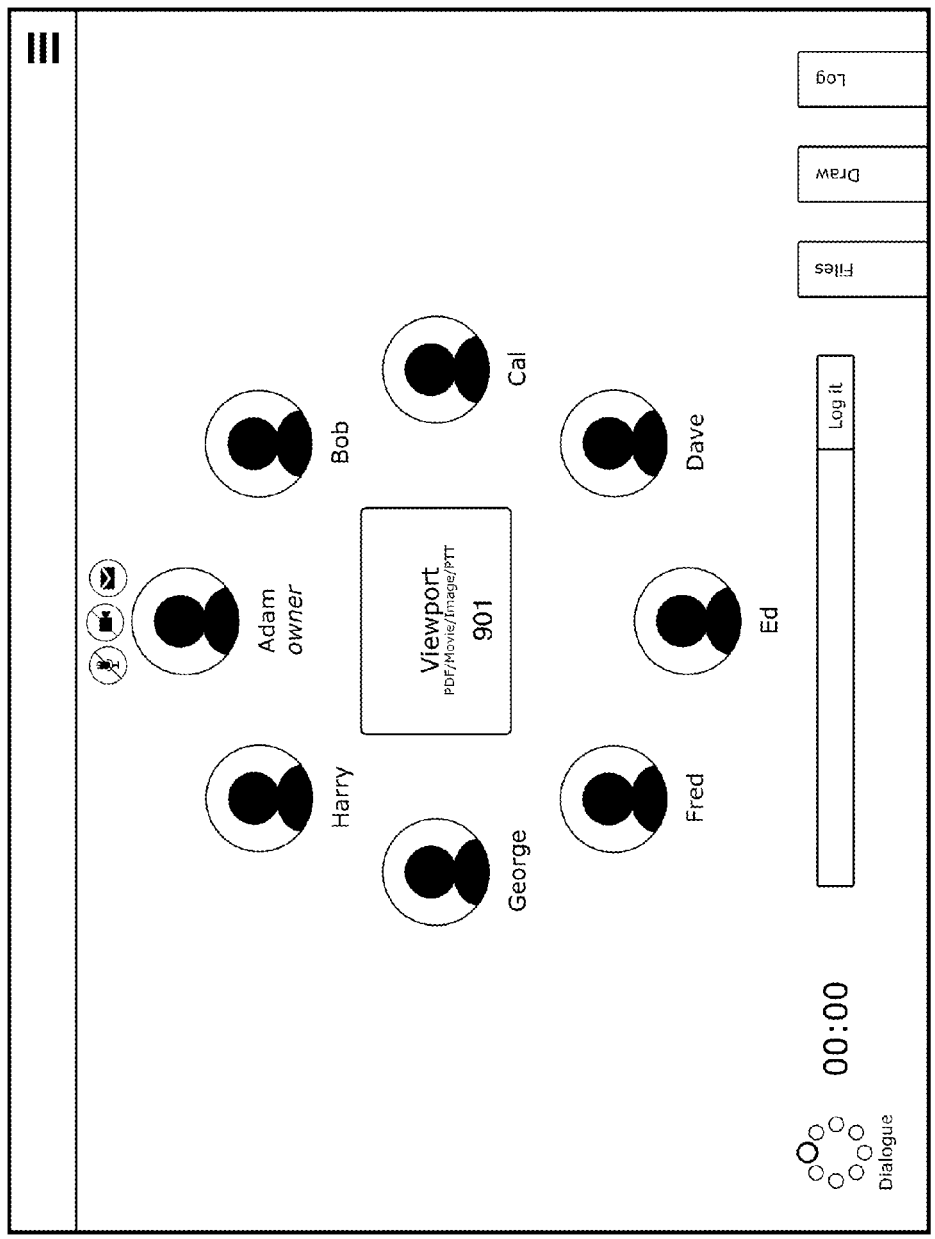
FIG. 9: shows a screenshot illustrating an exemplary user interface displayed on the user device of a participant during a dialogue stage in accordance with an embodiment of the invention.

FIG. 9 shows an exemplary user interface presented on the user device 101 of a participant 109 when the current stage is dialogue.

In this embodiment, a file 901 is displayed within the user interface to the participant 109.

Figure 10A:
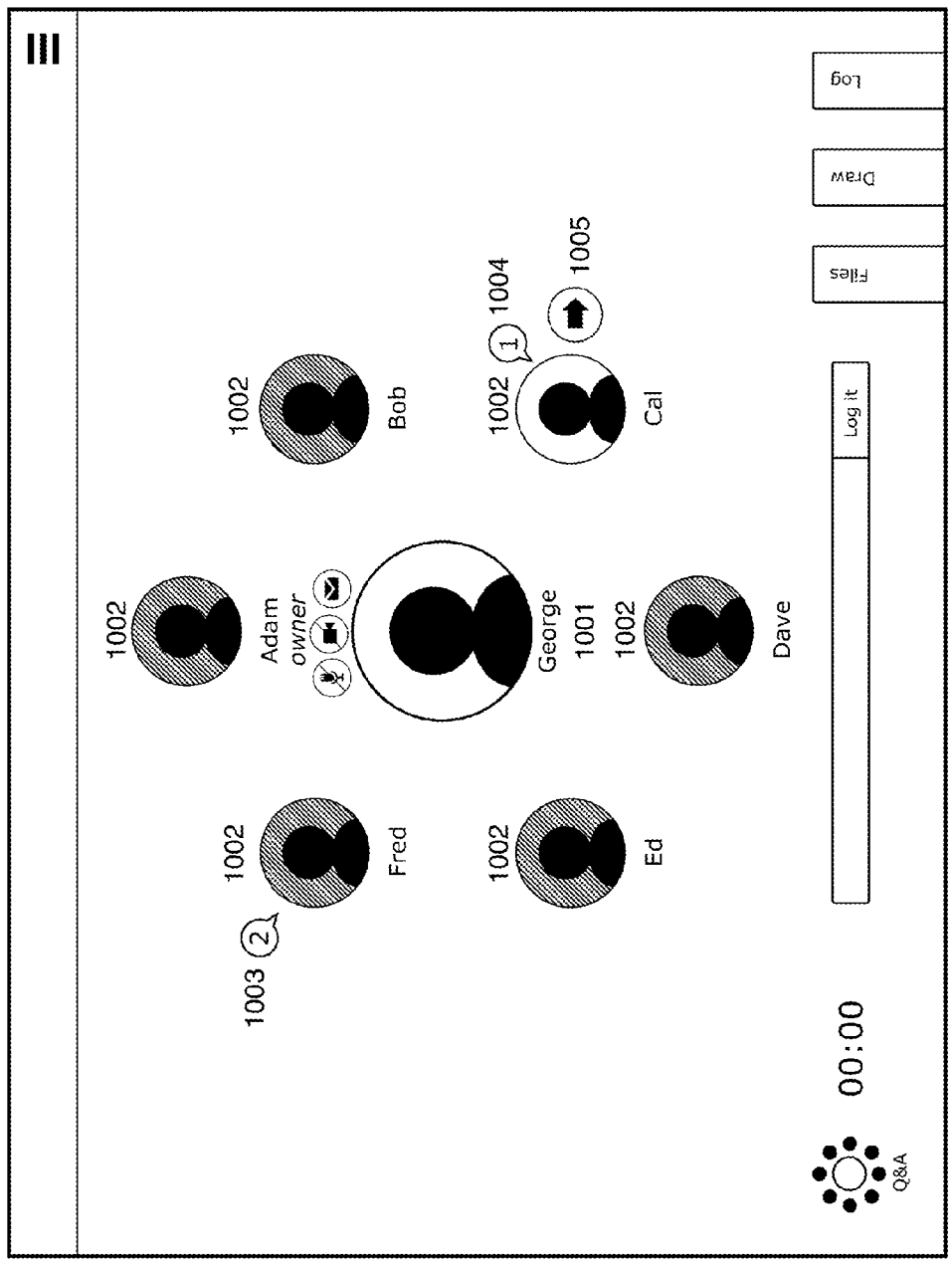
FIG. 10a: shows a screenshot illustrating an exemplary user interface displayed on the user device of a participant during a question and answer stage when the participant is the questionee in accordance with an embodiment of the invention.

FIG. 10a shows an exemplary user interface presented on the user device 101 of a participant 109 when the current stage is question and answer and where the participant 109 is designated as the questionee (i.e. presenter).

The participant's avatar 1001 is depicted in the centre of the interface surrounded by the avatars 1002 of the other participants.

Indicators 1003 and 1004 next to the avatars 1002 show whether a participant has a question and indicate in what order the participant has raised their question.

The user interface is operable to receive input from the participant to select a participant with a question by actuating a button 1005.

Figure 10B:
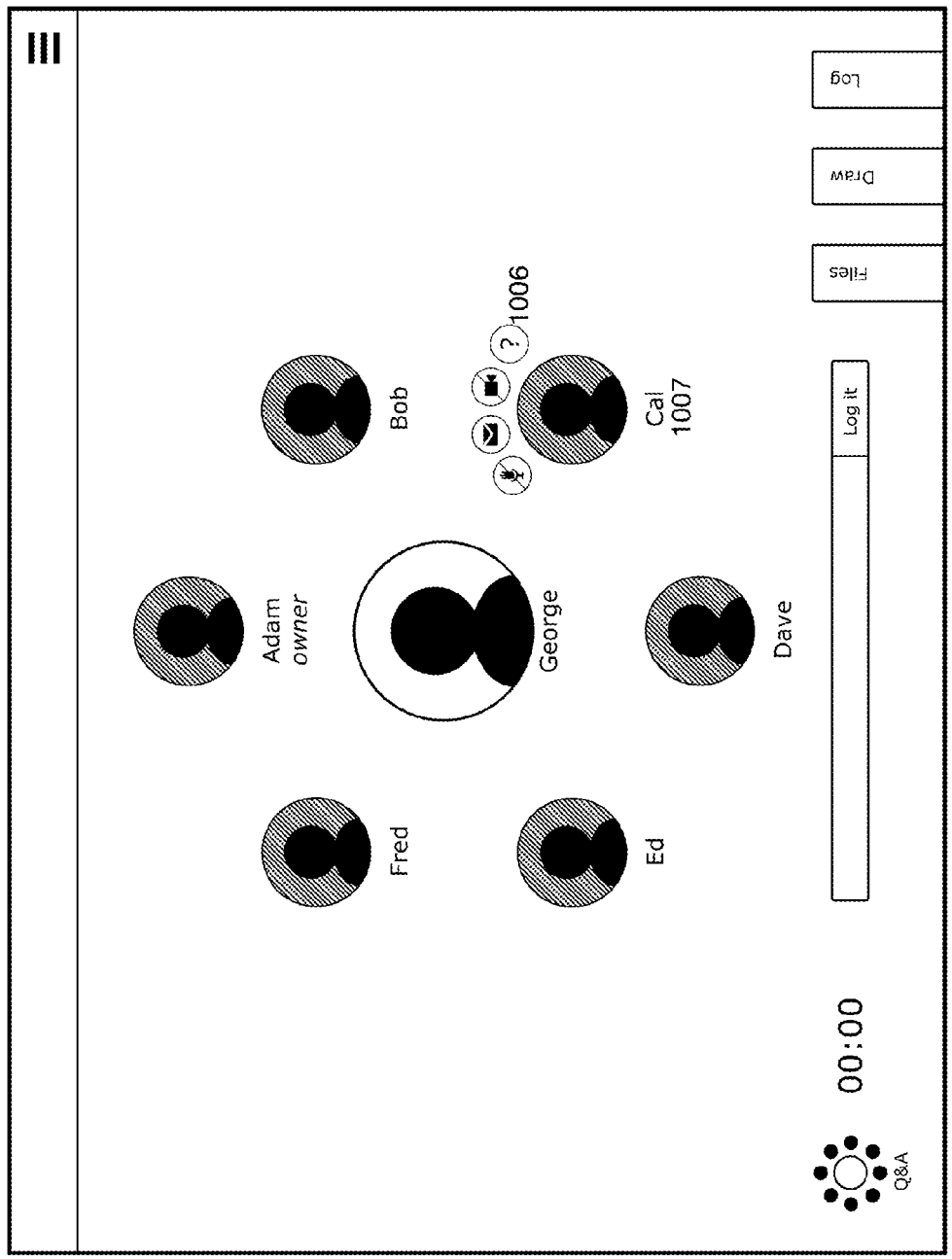
FIG. 10b: shows a screenshot illustrating an exemplary user interface displayed on the user device of a participant during a question and answer stage in accordance with an embodiment of the invention.

FIG. 10b shows an exemplary user interface presented on the user device 101 of a participant 109 when the current stage is question and answer and where the participant 109 is not the questionee.

When a participant 109 has a question, they may select the question icon 1006 above their avatar 1007 shown in the user interface.

Figure 10C:
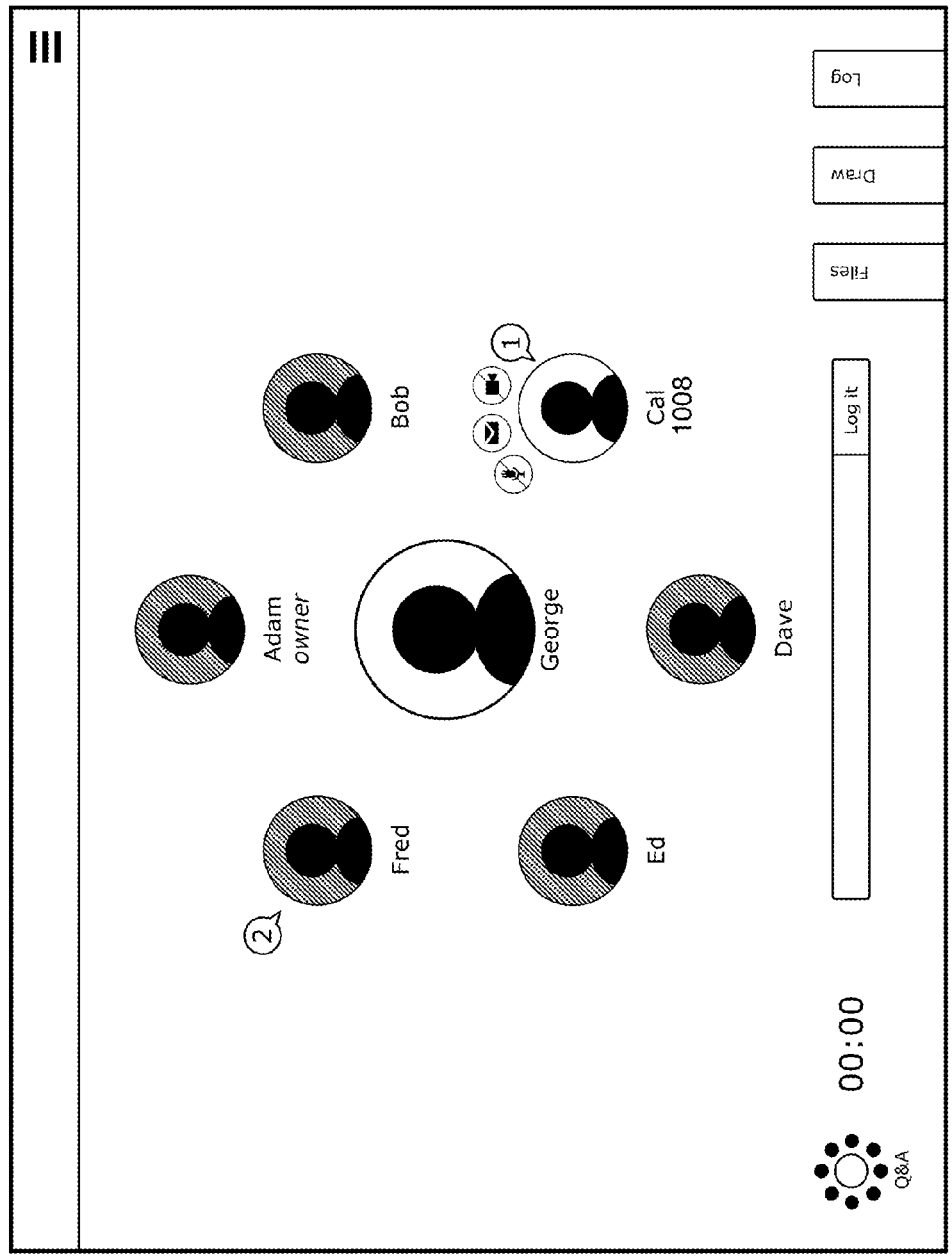
FIG. 10c: shows a screenshot illustrating an exemplary user interface displayed on the user device of a participant during a question and answer stage when the participant is a questioner in accordance with an embodiment of the invention.

FIG. 10c shows an exemplary user interface presented on the user device 101 of a participant 109 when the current stage is question and answer and where the participant 109 is asking a question of the questionee.

When a participant 109 is selected to ask their question by the questionee, the user interface will highlight their avatar 1008.

Figure 11:
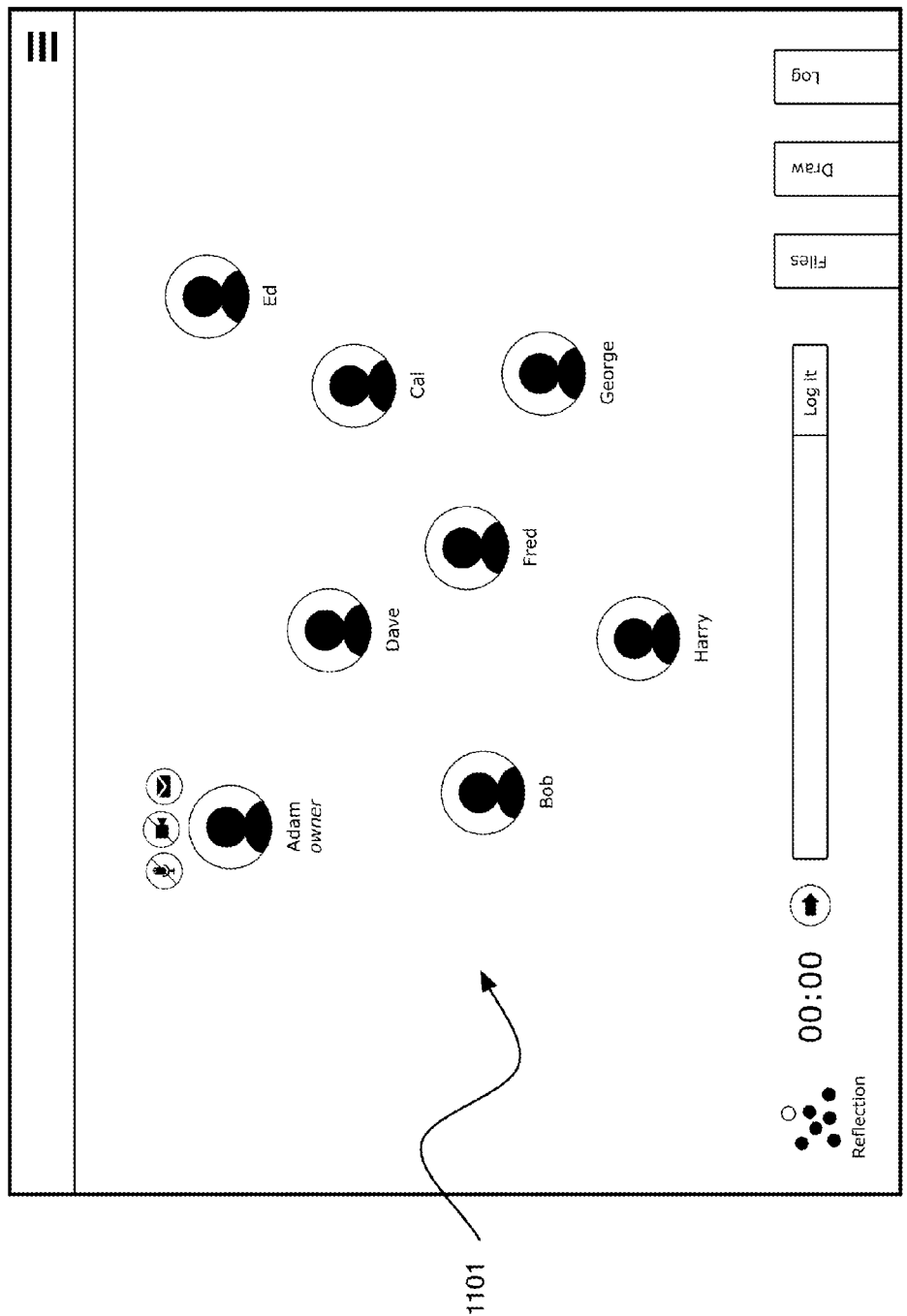
FIG. 11: shows a screenshot illustrating an exemplary user interface displayed on the user device of a participant during a reflection stage in accordance with an embodiment of the invention.

FIG. 11 shows an exemplary user interface presented on the user device of a participant when the current stage is reflection.

In the user interface, the avatars 1101 representing the participants are displayed in an unstructured form.

Figure 12A:
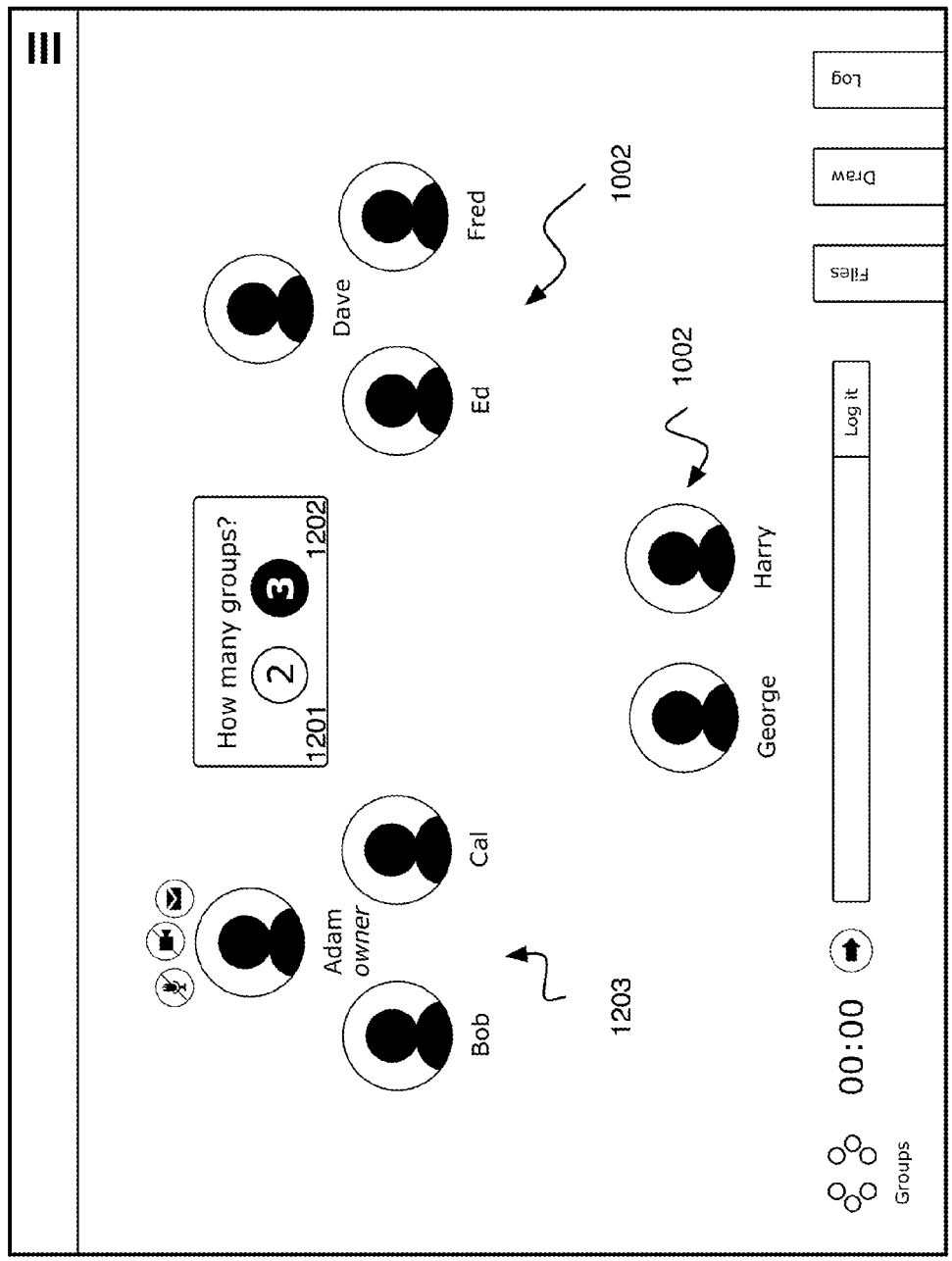
FIG. 12a: shows a screenshot illustrating an exemplary user interface displayed on the user device of a participant in accordance with an embodiment of the invention.

FIG. 12a shows an exemplary user interface presented on the user device 101 of a participant 109 when the current stage is group and where the participant 109 is the meeting organiser.

Within this user interface, the participant 109 may select the type of group distribution (e.g. two groups 1201 or three groups 1202). The avatars 1203 of the participants will be arranged within groups based upon the selected group type.

Figure 12B:
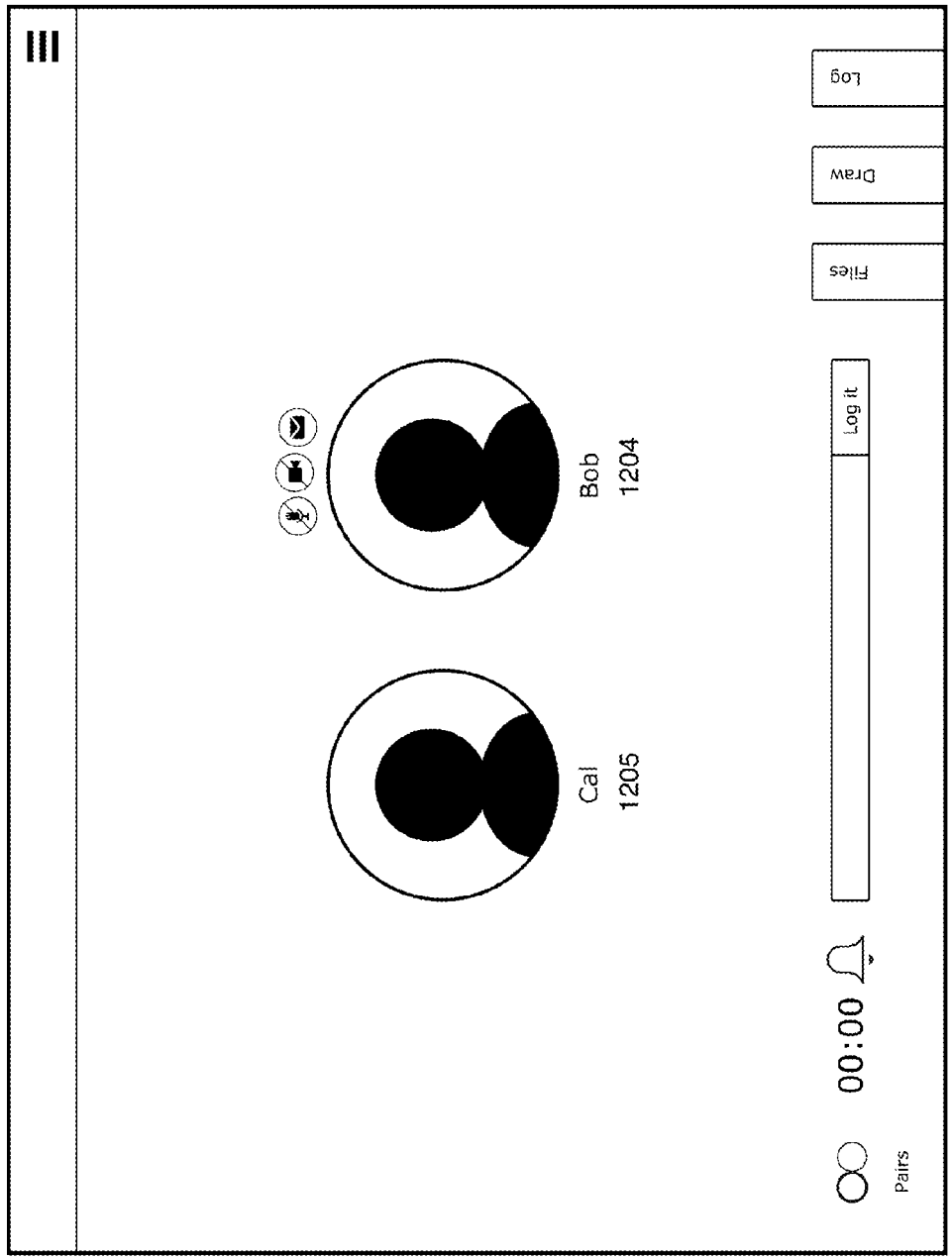
FIG. 12b: shows a screenshot illustrating an exemplary user interface displayed on the user device of a participant for a group stage when the participant is a meeting organiser in accordance with an embodiment of the invention.

FIG. 12b shows an exemplary user interface presented on the user device 101 of a participant 109 when the current stage is group.

The avatar 1204 of the participant 109 is displayed with the avatars 1205 of the other participants of their group.

Figure 13:
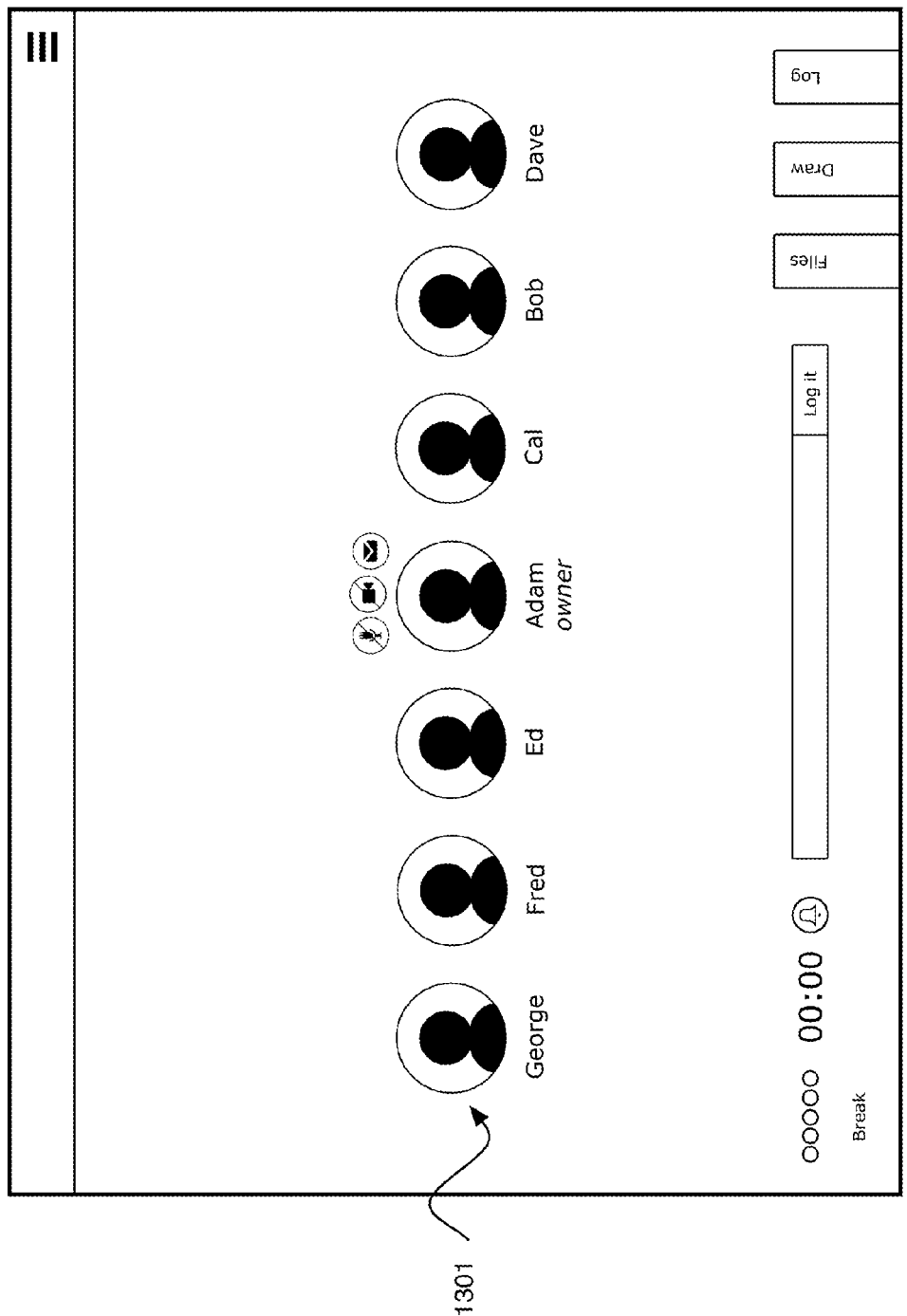
FIG. 13: shows a screenshot illustrating an exemplary user interface displayed on the user device of a participant during a group stage in accordance with an embodiment of the invention.

FIG. 13 shows an exemplary user interface presented on the user device 101 of a participant 109 when the current stage is break.

The avatars 1301 of the participants are displayed within a line within the user interface.

Figure 14A:
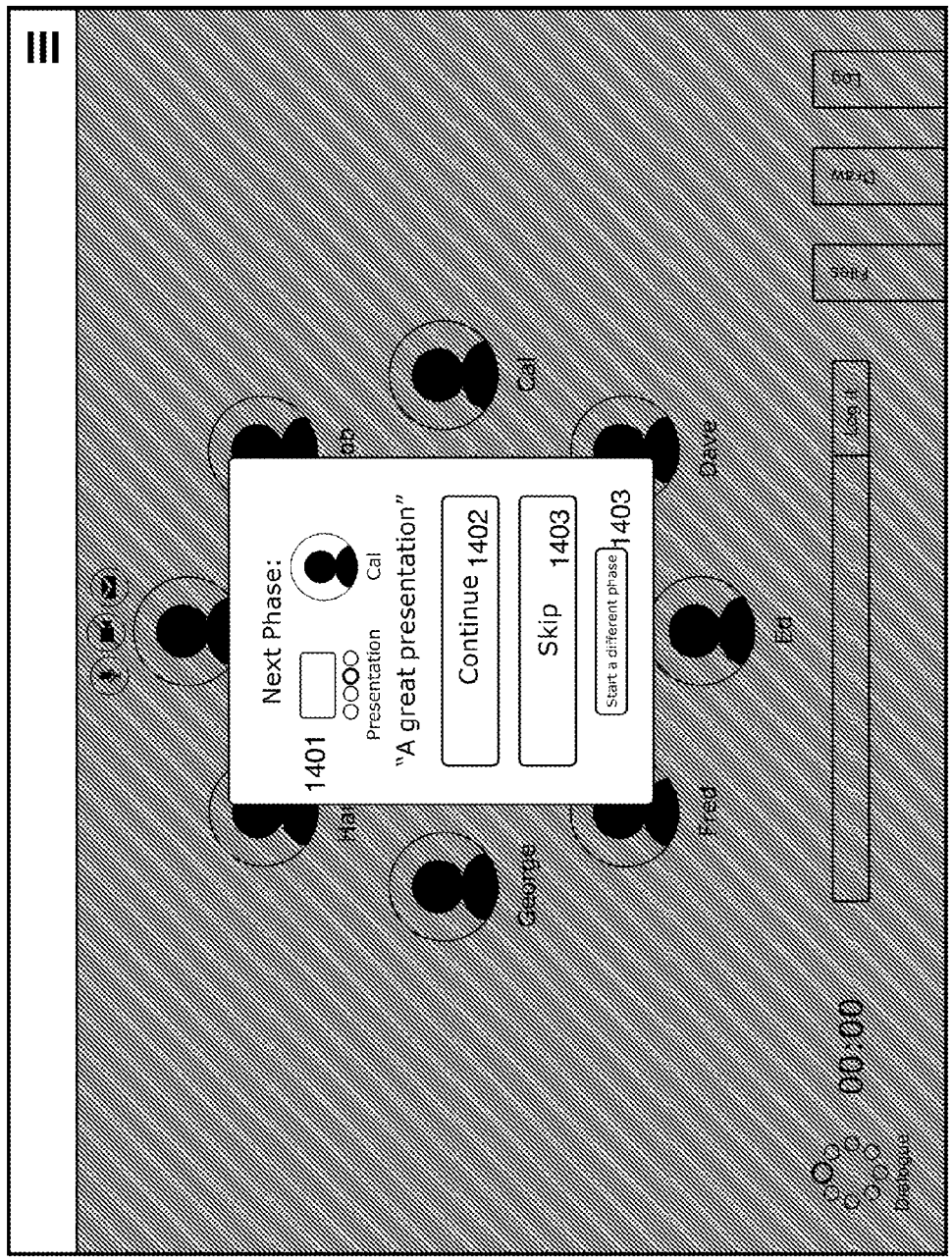
FIG. 14a: shows a screenshot illustrating an exemplary user interface displayed on the user device of a participant during the online meeting where the participant is a meeting organiser in accordance with an embodiment of the invention.

FIG. 14a shows an exemplary user interface presented on the user device 101 of a participant 109 when the current stage has ended and where the participant is the meeting organiser.

The next stage 1401 is displayed on the user interface and the participant can select of the following buttons: to continue to the next stage 1402, skip the next stage 1403, or add a new stage 1404.

Figure 14B:
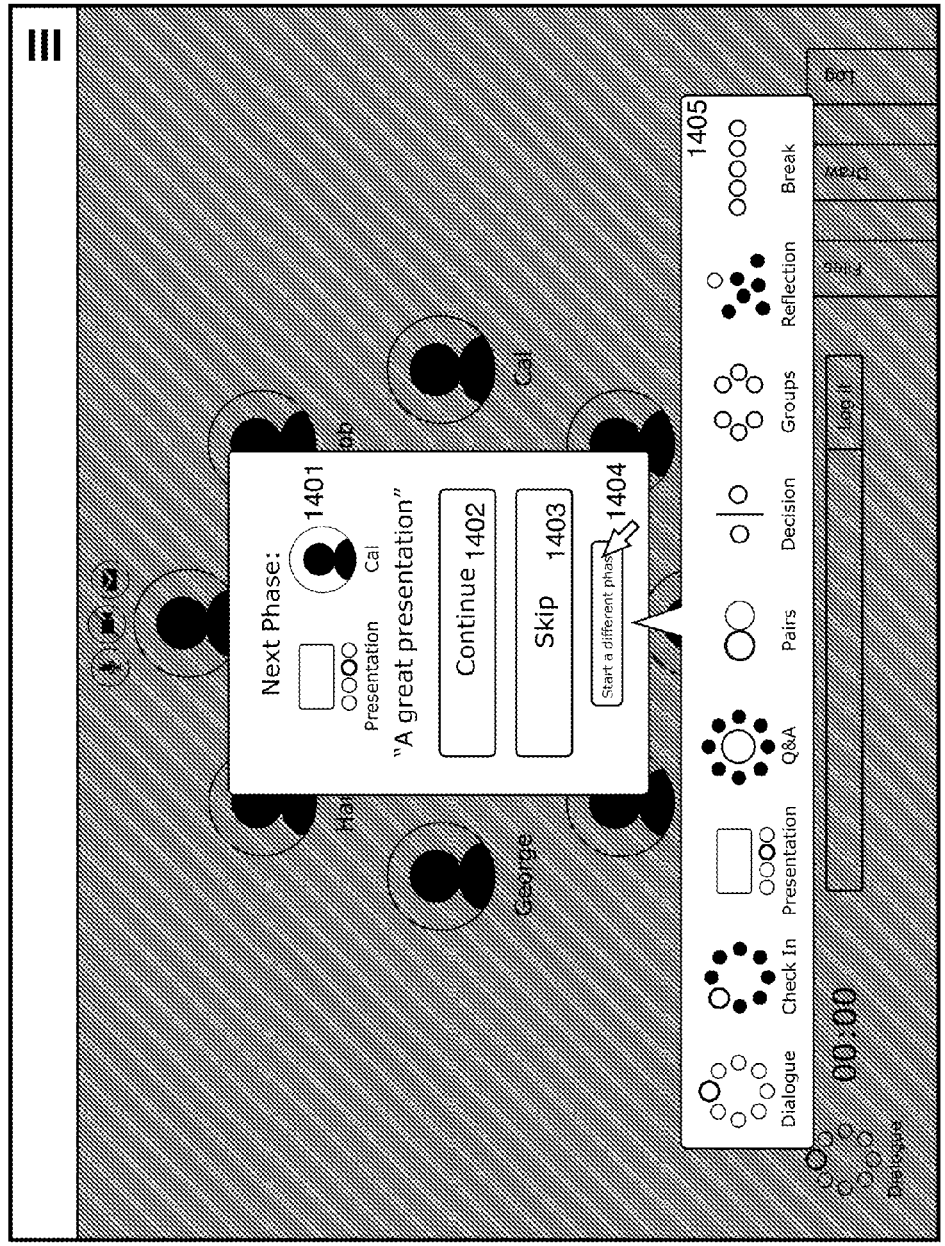
FIG. 14b: shows a screenshot illustrating an exemplary user interface displayed on the user device of a participant during the online meeting where the participant is a meeting organiser in accordance with an embodiment of the invention.

FIG. 14b shows an exemplary user interface presented on the user device 101 of a participant 109 when the participant has selected to add a new stage.

A plurality of stage types 1405 are displayed on the user interface for the participant to select.

Potential advantages of some embodiments of the present invention are that audio transmission between participants in a video conference can be controlled to prevent aural clashing of audio streams and to enable clear communications for collaborative use such as online meetings, and flexible structure can be added to video conferencing to facilitate both effective and dynamic use of video conferencing by participants.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

The invention claimed is:

1. A method of controlling communications for an online meeting including multiple stages, the method including:
at least one processor of a communications controller coordinating, during the online meeting, transmission of audio from each of a plurality of user devices participating in the online meeting to the other user devices participating in the online meeting via a communications system, wherein each user device is associated with a different participant of the meeting;
the at least one processor of the communications controller progressing through the multiple stages of the online meeting, wherein each stage defines a controlled interaction between the plurality of user devices and is associated with audio configuration data;
at each stage, the at least one processor of the communications controller automatically muting audio received from one or more of the plurality of user devices in accordance with the audio configuration data associated with that stage such that the muted audio is not generated at the other user devices;

wherein, at each stage, the audio is received at each of the plurality of user devices from one or more of the plurality of participants via a microphone associated with the respective user device;

during the online meeting, displaying, on at least some of the user devices, a user interface progressing through the multiple stages of the online meeting, the user interface including (1) representations of the plurality of participants, (2) an audio indicator, for each displayed representation of the participant, which changes depending on whether or not that participant is muted based on the audio configuration data, and (3) question indicators for two or more participants displayed in the user interface and muted, when the requests for questions are made by the two or more participants, in accordance with the audio configuration data.

2. A method as claimed in claim 1, wherein the audio configuration data defines when and how muting is to be applied during each of the stages.

3. A method as claimed in claim 1, wherein the question indicators indicate in what order the participants made requests for questions.

4. A method as claimed in claim 1, wherein the at least one processor mutes the audio by instructing the user device for each participant not to play the audio received by the user devices from the one or more muted devices.

5. A method as claimed in claim 1, wherein the at least one processor mutes the audio by halting transmission of the audio from the one or more muted devices to the other user devices.

6. A method as claimed in claim 1, further including: receiving input from at least one of the participants to override the audio configuration data to mute or un-mute audio for one or more of the plurality of participants.

7. A communications controller comprising at least one processor configured to:

coordinate, during an online meeting including multiple stages, transmission of audio from each of a plurality of user devices participating in the online meeting to the other user devices participating in the online meeting via a communications system, wherein each user device is associated with a different participant of the meeting;

progress through the multiple stages of the online meeting, wherein each stage defines a controlled interaction between the plurality of user devices and is associated with audio configuration data;

at each stage, automatically mute audio from one or more of the plurality of user devices in accordance with the audio configuration data associated with that stage such that the muted audio is not generated at the other user devices;

wherein, at each stage, the audio is received at each of the plurality of user devices from one or more of the plurality of participants via a microphone associated with the respective user device;

during the online meeting, display, on at least some of the user devices, a user interface progressing through the multiple stages of the online meeting, the user interface including (1) representations of the plurality of participants, (2) an audio indicator, for each displayed representation of the participant, which changes depending on whether or not that participant is muted based on the audio configuration data, and (3) question indicators for two or more participants displayed in the user interface and muted, when the requests for questions are made by the two or more participants, in accordance with the audio configuration data.

8. A system for controlling communications, including:
a communications controller as claimed in claim 7;
a communications system; and
a plurality of user devices.

9. The communications controller of claim 7, wherein the user interface include a speak button, and the at least one processor is further configured to make the speak button inactive while a participant of a user device that is not muted is speaking, and active when the participant of the user device that is not muted finishes speaking.

10. The communications controller of claim 7, wherein the user interface includes an indicator for the participant to know when the participant's user device is muted.

11. The communications controller of claim 7, wherein the question indicators indicate in what order the participants made requests for questions.

12. The communications controller of claim 7, wherein in at least one of the stages the participants are grouped into a plurality of groups, and wherein the at least one processor is configured to coordinate transmission of audio between the participants of each group via the communications system such that communications are not transmitted between the groups.

13. The communications controller of claim 7, wherein the at least one processor is further configured to instruct the user devices muted according to the audio configuration data to mute their microphone.

14. The communications controller of claim 7, wherein at least one of the user devices is associated with a participant who organized the online meeting and the user interface displayed on the user device associated with the participant who organized the online meeting includes an option to override the audio configuration data.

15. A controller for managing communication between a plurality participants associated with respective user devices during an online meeting including a plurality of stages, the controller comprising:

memory storing audio configuration data for the plurality of stages of the online meeting;

a communications interface for coupling the controller to the user devices via a network; and a processing system including at least one processor coupled to the memory and the communications interface, the processing system configured to, during the online meeting:

receive audio from each of the user devices participating in the online meeting, wherein each user device is associated with a different participant of the meeting;

progress through the plurality of stages of the online meeting, wherein each stage defines a controlled interaction between the participants and includes a respective audio configuration data defining how the received audio is to be distributed to the user devices during the meeting;

at each stage, coordinate transmission, via the network, of received audio from one or more of the plurality of user devices to the other user devices in accordance with the audio configuration data associated with that stage, wherein during at least one of the stages the received audio from two or more user devices is not transmitted to the other user devices and received audio from one or more user devices is transmitted to the other user devices; and control display of a user interface on each of the user devices, wherein the user interface includes (1) representations of the plurality of participants, and (2) an audio indicator, for each displayed representation of the participant, which changes depending on whether or not that participant's audio is transmitted or not according to the audio configuration data, wherein at least one of the user devices is associated with a participant who organized the online meeting and the user interface displayed on the user device associated with the participant who organized the online meeting includes an option to override the audio configuration data for one or more stages.

16. The controller of claim 15 wherein the user interface displayed on each of the user devices further includes question indicators for two or more participants displayed in the user interface with an indication of an order the participants made requests for questions.

\* \* \* \* \*